(12) United States Patent
Schmidt et al.

(10) Patent No.: US 12,411,028 B2
(45) Date of Patent: Sep. 9, 2025

(54) HYGIENIC ADAPTER FOR FIELD INSTRUMENT

(71) Applicant: Endress+Hauser SE+Co. KG, Maulburg (DE)

(72) Inventors: Robert Schmidt, Schopfheim (DE); Franco Ferraro, Schopfheim (DE)

(73) Assignee: Endress+Hauser SE+Co. KG, Maulburg (DE)

(*) Notice: Subject to any disclaimer, the term of this patent is extended or adjusted under 35 U.S.C. 154(b) by 368 days.

(21) Appl. No.: 17/754,296

(22) PCT Filed: Aug. 20, 2020

(86) PCT No.: PCT/EP2020/073417
§ 371 (c)(1),
(2) Date: Mar. 29, 2022

(87) PCT Pub. No.: WO2021/063598
PCT Pub. Date: Apr. 8, 2021

(65) Prior Publication Data
US 2022/0373369 A1 Nov. 24, 2022

(30) Foreign Application Priority Data
Sep. 30, 2019 (DE) ............ 10 2019 126 381.6

(51) Int. Cl.
*G01D 11/30* (2006.01)
*F16B 33/00* (2006.01)
(Continued)

(52) U.S. Cl.
CPC ............ *G01D 11/30* (2013.01); *F16B 33/004* (2013.01); *F16B 37/122* (2013.01);
(Continued)

(58) Field of Classification Search
CPC ....... G01D 11/30; G01F 15/18; G01F 23/268; F16B 33/004; F16B 37/122; F16B 37/145; F16B 43/001
See application file for complete search history.

(56) References Cited

U.S. PATENT DOCUMENTS

| 4,495,810 A | 1/1985 | Tessarzik et al. |
| 4,799,174 A | 1/1989 | Kramer et al. |

(Continued)

FOREIGN PATENT DOCUMENTS

| CH | 701837 B1 | 3/2011 |
| CN | 104379982 A | 2/2015 |

(Continued)

OTHER PUBLICATIONS

English translation of DE102016114565 accessed from iq.ip.com.*

*Primary Examiner* — Kristina M Deherrera
*Assistant Examiner* — Jean F Morello
(74) *Attorney, Agent, or Firm* — Kelly J. Smith; Endress+Hauser (USA) Holding, Inc.

(57) ABSTRACT

A securement arrangement for introducing a field instrument into a container includes a connection adapter and a sealing element. The field instrument includes a housing and a sensor. The sensor of the field instrument protrudes inwardly into the container, and the field instrument serves for determining and/or monitoring a process variable of a medium in the container. The connection adapter includes a cylindrical basic body, on which a first securement element is arranged for securing the connection adapter to the field instrument. The connection adapter surrounds the field instrument when the connection adapter is secured to the field instrument. A second securement element is also arranged on the connection adapter for securing the connection adapter to a container adapter. The container adapter surrounds the connection adapter when the container adapter is secured to the (Continued)

connection adapter. A first support of the connection adapter accommodates the sealing element.

15 Claims, 3 Drawing Sheets

(51) Int. Cl.
  *F16B 37/12* (2006.01)
  *F16B 37/14* (2006.01)
  *F16B 43/00* (2006.01)
  *G01F 15/18* (2006.01)
  *G01F 23/263* (2022.01)

(52) U.S. Cl.
  CPC .......... *F16B 37/145* (2013.01); *F16B 43/001* (2013.01); *G01F 15/18* (2013.01); *G01F 23/268* (2013.01)

(56) References Cited

U.S. PATENT DOCUMENTS

| | | |
|---|---|---|
| 7,159,473 B1 | 1/2007 | Bowers |
| 2015/0082880 A1 | 3/2015 | Allen |
| 2016/0370211 A1 | 12/2016 | Heer |
| 2018/0149269 A1 | 5/2018 | Schneider et al. |
| 2018/0348022 A1 | 12/2018 | Ushiro et al. |

FOREIGN PATENT DOCUMENTS

| | | |
|---|---|---|
| CN | 105008692 A | 10/2015 |
| CN | 108369116 A | 8/2018 |
| CN | 108369125 A | 8/2018 |
| CN | 109073445 A | 12/2018 |
| DE | 202008018197 U1 | 12/2011 |
| DE | 102015122177 A1 | 6/2017 |
| DE | 102016114565 A1 | 2/2018 |
| JP | 57048616 A | 3/1982 |

* cited by examiner

HYGIENIC ADAPTER FOR FIELD INSTRUMENT

CROSS-REFERENCE TO RELATED APPLICATIONS

The present application is related to and claims the priority benefit of German Patent Application No. 10 2019 126 381.6, filed on Sep. 30, 2019 and International Patent Application No. PCT/EP2020/073417, filed on Aug. 20, 2020, the entire contents of which are incorporated herein by reference.

TECHNICAL FIELD

The invention relates to a securement arrangement for introducing a field instrument into a container, to an adapter arrangement having a securement arrangement of the invention, as well as to a measuring arrangement having an adapter arrangement of the invention. The field instrument includes a housing and a sensor, wherein the sensor of the field instrument protrudes, at least partially, inwardly into the container, wherein the field instrument serves for determining and/or monitoring a physical or chemical, process variable of a medium in the container.

BACKGROUND

Field instruments serve for monitoring and/or determining at least one, for example chemical or physical, process variable of a medium. In the context of the invention, in principle, all measuring devices are referred to as field instruments, which are applied near to a process and which deliver, or process, process relevant information. A large number of such field instruments are produced and sold by the Endress+Hauser group of companies.

The process variable to be determined by the field instrument can be the fill level, the flow, the pressure, the temperature, the pH value, a redox potential, or the conductivity of the medium. The different, possible measuring principles corresponding to the process variable are known in the state of the art and are therefore not explained further here. Field devices for measuring fill level are embodied especially as microwave, fill level measuring devices, ultrasonic, fill level measuring devices, time domain reflectometric, fill level measuring devices (TDR), radiometric, fill level measuring devices, capacitive, fill level measuring devices, conductive, fill level measuring devices and vibronic, fill level measuring devices. Field devices for measuring the flow, in contrast, work, for example, according to the Coriolis-, ultrasonic-, vortex-, thermal and/or magnetically inductive measuring principles. In the case of pressure measuring devices, there are absolute-, relative- and difference, pressure measuring devices.

A field instrument includes at least one sensor coming, at least partially, and at least at times, in contact with the process and an electronics, which serves, for example, for signal registration, -evaluation and/or -feeding. The electronics of the field instrument is typically arranged in a housing and has at least one connecting element for connecting the electronics to the sensor and/or an external unit. The connecting element can be any type of connection. Even a wireless connection can serve as a connecting element. The electronics and the sensor of the field instrument can be embodied in the form of separate units with separate housings or as one unit having a single housing.

The medium having the process variable to be monitored or to be determined by the field instrument is typically located in a container. In the case of noninvasive field instruments, the sensor does not need to be in direct contact with the medium and is, consequently, for example, frequently secured to an outer side of the container. In the case of invasive field instruments, the sensor of the field instrument protrudes into the container or at least is flush with the inner surface of the container. The sensor of the field instrument is frequently held by means of a securement mechanism in an opening in/on the container. This occurs typically using a sealing element. In such case, gaps, joints and/or dead spaces can arise. In such gaps, joints and/or dead spaces, germs can potentially collect and/or deposits, or biofilms, form. These germs and/or deposits are, in turn, unacceptable for sterile applications, for example, in the pharmaceutical, feed- and food industries.

In this connection, different international or national regulatory authorities have developed standards for producing and providing equipment permitted for sterile processes, in which a product is made from a raw or starting material by the application of chemical, physical or biological procedures. In the American region, in such case, standards of the "American Society of Mechanical Engineers" (ASME), especially the so-called "ASME Bioprocessing Equipment" (BPE) standard, and the "3-A Sanitary Standards Inc." (3-A) can be mentioned. In the European region, especially the "European Hygienic Engineering & Design Group" (EHEDG) is relevant. These standards fulfill high hygienic requirements and define, above all, guidelines for preventing contamination and for easy mechanical cleaning and sterilization of surfaces, which affect the process. The EHEDG provides, for example, that in the use of sealing elements a gap free design must be utilized. According to the EHEDG, direct metal-metal connections, which contact the medium, must be welded. Since the containers are, as a rule, produced of metal, (metal) adapters for securing a field instrument to the container are frequently welded to the container. For non-metallic containers, however, also other securement methods, such as clamps or screws, are options.

Known from the state of the art are numerous securements for field instruments in a container. However, not all satisfy the established requirements of the hygiene standards and/or they have disadvantages relative to the mounting of the securement.

A usual method of securing a field instrument in a container involves a one piece adapter. The adapter is secured to an opening of the container wall and provided with an internal screw thread. Toward the process, the adapter has a groove, into which a sealing ring is introduced. The field instrument includes a section, which is embodied as screw thread and can be screwed into the adapter, such that a part of the sensor of the field instrument protrudes through the adapter into the container or terminates flush with the inner surface of the container wall. In the assembly, first, the sealing ring is placed in the adapter and then the field instrument is screwed through the sealing ring into the adapter. The problem with this procedure is that the introduction of the field instrument in the adapter is associated with a high torque, which involves a loading of the sealing ring and the screw thread. A supplemental problem is that, over time, the sealing ring needs to be replaced. Such can be required upon replacement of the field instrument, or be necessary due to wear of the sealing ring, or be regularly required for hygienic reasons. The replacement of the sealing ring in the case of adapter installed in the container involves manually removing the sealing ring from the groove and suitably emplacing a new sealing ring. Since the adapter is usually welded into the container and therewith not easily removable, the manual mounting of the sealing ring is a complicated procedure. The groove often includes hollow space for the expansion of the sealing ring with temperature, moisture, etc. For hygienic applications, such an adapter is, thus, in many cases, not permissible.

Another method for securing a field instrument involves a multipart adapter system. Such adapter systems are composed, for example, of a weld-in adapter, an adapter ring, a coupling nut and a shaped seal. The weld-in adapter has a groove toward the process for supporting the shaped seal and a section having a screw thread. Embedded in the weld-in adapter is the adapter ring, which likewise has toward the process a support for the shaped seal. By means of the coupling nut, the adapter ring is connected with the weld-in adapter. The field instrument is then led at least with a section of the sensor through the assembled adapter system into the container. Such a multipart securement arrangement is, however, frequently comparatively costly and complex for production and assembly.

DE 103 08 086 B3 describes a multipart securement system having at least one sealing ring, an adapter ring and at least one seat. The field instrument protrudes, in such case, with at least one part of the sensor through the seat and into the container. The seat includes in the direction of the process a change of diameter for accommodating a sealing ring. The adapter ring is introducible into the seat and includes toward the process an area for accommodating the sealing element. The sealing element is, thus, held securely by adapter ring and seat. The field instrument is introducible into the adapter ring and the seat and is secured to the seat. In assembly, first, the adapter ring and the sealing ring are placed on the field instrument, before the field instrument is led into the seat. The adapter ring is, in such case, not secured to the field instrument, but, instead, sits before introducing the field instrument into the seat only on a support surface of the field instrument and is held securely by the sealing ring at its position in the field instrument. As a result, such manner of securement is only usable for field instruments, which have a support surface for application of the adapter ring. Since the support surface of the field instrument typically adjoins the sensor and the adapter ring, thus, sits on the sensor, the adapter ring leads, moreover, to a reduction of the contact area between sensor and medium.

It is known for checking the state of sealing of an arrangement to provide a leakage hole or a leakage bore in an outer surface of the basic body of the adapter in a region facing the process. In the case, in which leakage unexpectedly occurs, i.e. a migration of medium from the container into the adapter, the medium can then escape from the adapter via the leakage hole. The leakage bore, thus, shows, immediately, when the sealing element has within the adapter a defect or an incorrect positioning. Arrangements without leakage hole do not conform to the guidelines for hygienic applications, especially not the guidelines of the EHEDG. Accordingly, leakage holes are typically found in arrangements, which need to satisfy a high hygiene standard, such as, for example, also in the above described arrangement of DE 103 08 086 B3.

SUMMARY

Starting from the above-described state of the art, an object of the invention is to provide an arrangement for securing a field instrument on a container, which arrangement satisfies usual hygiene requirements in especially easy manner.

The object is achieved according to the invention by the securement arrangement as defined in claim 1, the adapter arrangement as defined in claim 3 and the measuring arrangement as defined in claim 11.

As regards the securement arrangement for introducing a field instrument into a container, wherein the field instrument includes a housing and a sensor, wherein the sensor of the field instrument protrudes, at least partially, inwardly into the container, and wherein the field instrument serves for determining and/or monitoring a physical or chemical, process variable of a medium in the container, the object is achieved by a securement arrangement comprising
a connection adapter, and
a sealing element.

The connection adapter includes a cylindrical basic body, on which components are arranged as follows: a first securement element for securing the connection adapter to the field instrument, wherein the connection adapter is securable to the field instrument in such a manner that the connection adapter at least partially surrounds the field instrument, when it is secured to the field instrument; a second securement element for securing the connection adapter to a container adapter, wherein the connection adapter is securable to the container adapter in such a manner that the container adapter at least partially surrounds the connection adapter, when it is secured to the connection adapter; and a first support of the connection adapter for accommodating a sealing element. The securement arrangement of the invention enables an accommodating of the sealing element on the first support of the connection adapter.

After securing the connection adapter to the field instrument, the sealing element is accommodated on the first support and led, at least partially, over the sensor of the field instrument. The sealing element is, thus, positioned before the field instrument is secured to the container. Only after securing the connection adapter to the field instrument and the mounting of the sealing element is the field instrument secured to the container adapter, which is secured to the container. As a result, the sealing element is also replaceable in especially easy manner.

During the introduction of the field instrument into the container adapter, before the final position of the field instrument in the container adapter is reached, a lesser application of force is used, since mechanical friction between the sealing element and the container adapter can be avoided by the use of the securement arrangement. Only shortly before reaching the final position of the field instrument in the container adapter is an increased application of force necessary, since then the sealing element is pressed between the first support and an additional support of the container adapter. Compared with existing solutions, the application of force as well as friction against the sealing element are in this way on the whole decreased. The sealing element according to the invention is not mounted, process-side, on the container, but, instead, by means of the connection adapter, directly on the field instrument. In this way, the sealing element can be precisely positioned. Such is important, in order to bring the sealing element into that position, which after introducing the field instrument into the container cares for an optimum state of sealing of the arrangement. This positioning, in the following called the target position, can be directly visually checked.

For securing the field instrument to the container, on the one hand, the container adapter of the invention can be applied, such as described in the case of the adapter arrangement below. On the other hand, also any suitable second adapter can be utilized, which, for example, is already secured to a container and which satisfies the function of securing the field instrument to the container. The securement arrangement can, thus, be applied as a retrofit for securing a field instrument to a container, wherein the mounting of the sealing element on the field instrument occurs first by means of the connection adapter. This retrofitting is especially advantageous for field instruments, in the case of which a sealing element cannot be mounted in simple manner on a housing of the field instrument, before the field instrument is secured to the container. Such is the case, for example, for field instruments, which have a constant housing diameter in a region, which is led through the container adapter, or second adapter, and into the container.

The sealing element is embodied in such a manner that it can be accommodated on the support of the connection adapter. In an advantageous embodiment, it is provided that the sealing element is an O-ring or a seal of some other shape. Depending on embodiment of the support, the sealing element can be placed on the support or pressed into the support with light pressure. After securing the connection adapter to the field instrument, the sealing element is accommodated in the first support. The sealing element can be embodied to fit the support, thus, by shape interlocking.

The object of the invention is achieved, furthermore, by an adapter arrangement for introducing a field instrument into a container, comprising
- a securement arrangement of the invention according to at least one of the described embodiments, and
- a container adapter.

The container adapter includes a cylindrical basic body, in which components are arranged as follows: a third securement element for securing the container adapter to the container; a fourth securement element for securing the container adapter to the connection adapter by means of the second securement element; and a second support of the container adapter for accommodating the sealing element.

By placing the sealing element between the first support of the connection adapter and the second support of the container adapter, the sealing element can be led by means of the two supports into the target position, in order to assure the sealing of the adapter arrangement. The two supports serve to guide the sealing element into the desired target position, which assures an especially tight sealing of the adapter arrangement. The adapter arrangement assures that by means of the sealing element neither gaps, joints nor dead spaces face the process. Thus, the adapter arrangement assures a sealed and hygienic arrangement of the field instrument relative to the container. Thus, the guidelines for hygienic applications can be advantageously met with the adapter arrangement. Since the connection adapter is secured releasably to the container adapter, the connection adapter including the field instrument and the sealing element can be separated from the container adapter and then the sealing element, which sits on the connection adapter, can be replaced. Additionally in such case, a multipart adapter design is used, which can be produced and installed in simple manner, since it is based on only two adapters and a sealing element.

In an embodiment, the first and/or the second support are/is embodied in the form of a change in outer diameter of the connection adapter and a change in outer diameter of the container adapter, especially in the form of a step, or a support surface. Other possible embodiments are an edge, a shoulder, or a furrow.

In a preferred embodiment, the first and second supports are embodied to be mutually complementary. The two supports thus act together in such a manner that the sealing element can be accommodated between the two supports, when the connection adapter is secured to the container adapter. As a result of the first and second supports, the sealing element is held both by the connection adapter as well as also by the container adapter tightly in its position. A shifting of the sealing element toward or away from the process direction is thus prevented.

In an additional embodiment, the first and second supports exert a force on the sealing element, when the connection adapter is secured to the container adapter. In such case, the sealing element is radially and/or axially deformed as a result of the force exerted by the supports. The supports and/or the sealing element are especially embodied in such a manner that the deformed sealing element fills out, especially accurately fits, the two supports, whereby especially gaps, joints and/or dead spaces are prevented.

In another embodiment, at least one hole is arranged, in each case, in the region of a lateral surface of the basic body of the connection adapter and the basic body of the container adapter. The holes of the connection adapter and of the container adapter are arranged, in each case, along a longitudinal axis of the basic body of the connection adapter and the basic body of the container adapter in such a manner that the first, and/or second, support is/are arranged between the hole of the connection adapter, and/or the hole of the container adapter, and an end section of the connection adapter, or of the container adapter, facing the container. Especially, the holes of the connection adapter and container adapter are arranged, in each case, in regions of the connection adapter, and container adapter, in which no securement elements and no supports are arranged. The holes, or also leakage holes, have typically a diameter of some millimeters. The holes of the connection adapter, and container adapter, serve for checking the state of sealing of the sealing element of the adapter arrangement, such as already described above.

An advantageous embodiment includes that the holes of the connection adapter and the container adapter are so arranged that the hole of the connection adapter and the hole of the container adapter at least partially overlap, especially align with one another, when the connection adapter is secured to the container adapter. The overlapping of the hole of the connection adapter with the hole of the container adapter enables in simple manner the detecting of medium escaping from the container, when the sealing element of the field instrument is not effectively sealing against the contents of the container. This embodiment of the two holes of the connecting- and container adapters concerns especially the case of transgression of medium along the inner edge of the sealing element. In such a case, the leakage of the medium occurs from the adapter arrangement along the sensor of the field instrument through the hole of the connection adapter and through the hole of the container adapter. Advantageously, one of the holes has a greater diameter than the other, in order to assure the overlapping of the two holes, taking into consideration the tolerances of the second and fourth securement elements. The holes are especially oriented in such a manner that the medium, which enters from the container into the adapter arrangement can escape as directly as possible from the holes due to the force of gravity.

Furthermore, it is advantageous that the lateral surface of the connection adapter at least in the region of the hole of the connection adapter and the inner surface of the basic body of the container adapter in the region of the hole of the container adapter do not lie on one another, i.e. do no contact one another. Instead of that, an intermediate space, especially a radially enveloping, intermediate space, especially in the order of magnitude of millimeters, is provided between the two regionss. In the case of leakage, the medium can thus, easily escape from the adapter arrangement.

Another embodiment provides that the third securement element comprises a means for welding, screwing or clamping. As a result, the container adapter can be secured to the container by means of usual flange-, weld- or clamp connections.

Advantageously when the third securement element of the container adapter comprises a means for welding, the container adapter has in an end region away from the container a greater thickness than the basic body of the container adapter in a middle region. The greater thickness, which can also be a ridge or a reinforcement of the material, serves in such case for protecting against deformation of a region of the container adapter in the case of welding of the container adapter into the container.

The object of the invention is achieved, furthermore, by a measuring arrangement for introducing a field instrument into a container, comprising a securement arrangement of the invention according to at least one of the described embodiments,
a container adapter of the invention according to at least one of the described embodiments, and
a field instrument.

The field instrument, in such case, includes an electronics and a sensor. Typically, the sensor and the electronics of the field instrument are surrounded, at least partially, by at least one housing. The housing of the field instrument includes, additionally, a fifth securement element for securing the field instrument to the connection adapter by means of the first securement element.

In the measuring arrangement of the invention, first, the connection adapter is secured to the field instrument and the sealing element applied on the first support, wherein the sealing element is pushed over the sensor of the field instrument. Then, the connection adapter including the field instrument and the sealing element is secured to the container adapter. During the introduction of the field instrument into the container adapter the sealing element experiences little force, until shortly before reaching the final position of the field instrument in the container adapter. Only after the sealing element accommodated in the first support is accommodated on the second support, which occurs shortly before reaching the final position of the field instrument in the container adapter, is an increased exertion of force necessary, in order to deform the sealing element between the first and second supports. The sealing element, in such case, fills in between the two supports, such that a high state of sealing of the measuring arrangement is obtained. The field instrument can, in such case, be so embodied that the diameter of the field instrument decreases somewhat from the region of the first support toward an end region of the sensor toward the medium, such that the sealing element can be applied onto the field instrument especially easily. Since the sealing element is applied first to the field instrument by means of the connection adapter, a visual checking of the the target position of the sealing element is possible. Upon securing the connection adapter to the container adapter, the sealing element is led, especially automatically, by the two supports into the desired target position and can especially not dislodge in or opposite to the process direction. Due to the high state of sealing of the arrangement as well as the absence of dead spaces, gaps, etc., the measuring arrangement satisfies established guidelines of hygiene standards. The multipart measuring arrangement enables a simple installation of the field instrument on the container.

An advantageous embodiment provides that at least a first region of the field instrument, which protrudes, at least partially, inwardly into the connection adapter, when the field instrument is secured to the connection adapter, and at least a second region of the field instrument, which protrudes, at least partially, inwardly into the container adapter and into the container, when the field instrument is secured to the container adapter by means of the connection adapter, have the same outer diameter. Especially field instruments embodied in such a manner profit from the measuring arrangement or adapter arrangement of the invention. In such case, advantageously especially the fifth securement element, when it is arranged in the first or second region of the field instrument, effects no change of the outer diameter of the first and second regions of the field instrument.

In an additional embodiment, at least one of the securement elements has a screw thread. Advantageously, the first and fifth, and the second and fourth, screw threads are embodied to complement one another. Especially, in each case, an internal screw thread engages with a complementary external screw thread. The first, second, fourth and fifth securement elements are, especially, embodied as releasable securement elements. The third securement element is for hygienic applications, as a rule, embodied a means for welding, wherein for nonmetal-metal connections between container adapter and container also other securements are possible.

In an additional embodiment, the field instrument is a field instrument working according to the capacitive and/or conductive measuring principle(s). The process variable to be determined and/or to be monitored in this case is fill level, conductivity or dielectric constant. The invention, is, however, not limited to such field instruments, but, instead, is usable for numerous different kinds of field instruments based on different measuring principles, such as, for example, those mentioned above in the introduction of the description.

BRIEF DESCRIPTION OF THE DRAWINGS

The invention will now be explained in greater detail based on the appended drawing and its FIG. 1-FIG. 5. The figures of the drawing show as follows.

DETAILED DESCRIPTION

The invention is usable with a wide variety of field instruments 1. Without intending to limit the generality of the invention, the following description concerns, however, for the sake of convenience, a capacitive and/or conductive field instrument 1, such as shown schematically in FIG. 1. The process variable to be measured by the field instrument 1 is, especially, fill level, conductivity or dielectric constant. The considerations for such case can be applied analogously for other field instruments. For the solution of the invention, firstly, the geometry of the field instrument is important, since the invention relates to an arrangement of an instrument in a container.

Figure 1:
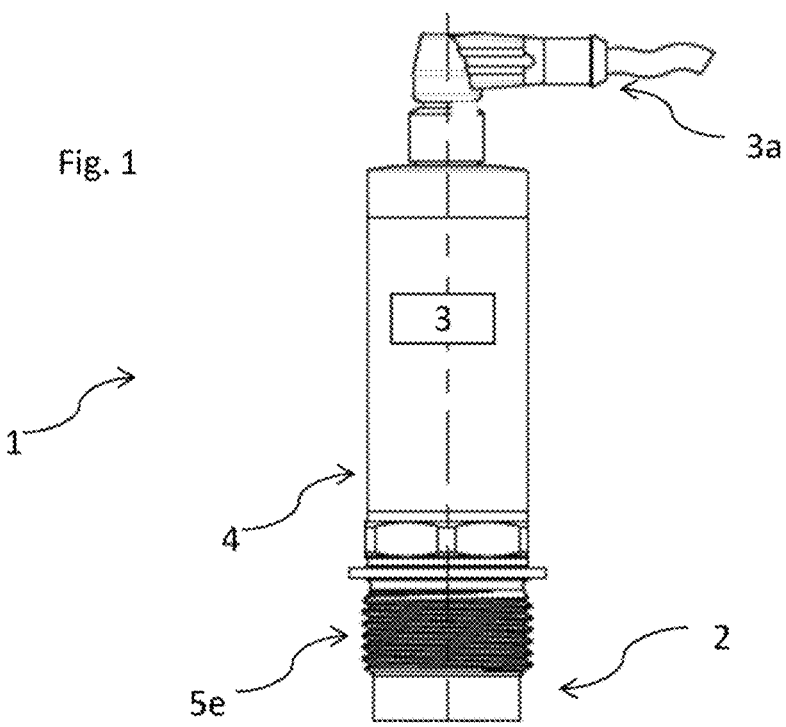
FIG. 1 shows a schematic view of a capacitive and/or conductive field instrument according to the state of the art.

Measuring methods based on a capacitive and/or conductive field instrument, especially a fill level measurement device, are known per se in the state of the art. Corresponding field instruments are produced and sold by the applicant, for example, under the marks, "Nivector", "Liquicap" and "Liquipoint". A schematic view of a corresponding field instrument is shown in FIG. 1. The sensor 2 and the electronics 3 of the field instrument 1 are embodied in compact construction as one unit. For measuring fill level, the sensor 2 of the field instrument 1 protrudes, at least partially, into the container. Sensor 2 comprises a coaxially embodied electrode group (not shown), which is connected with the electronics 3. The electronics 3 monitors or determines the fill level of the medium in the container based on the signal of the electrode group of the sensor 2 of the field instrument. In such case, at least one electrode of the electrode group is supplied with an excitation signal and the process variable is ascertained based on the received signal received from the electrode. For other details, reference is made, for example, to DE 10 2018 101 206 A1, DE 10 2014 118 547 A1 or DE 10161069 A1.

The electronics 3 includes a connecting element 3a for connecting the electronics 3 to an external unit. Furthermore, sensor 2 and electronics 3 of the field instrument 1 are surrounded by a housing 4. Housing 4 includes, additionally, a fifth securement element 5e, which, for the sake of convenience, comprises an external screw thread. However, also other types of securement can be used for the securement element 5e.

Figure 2:
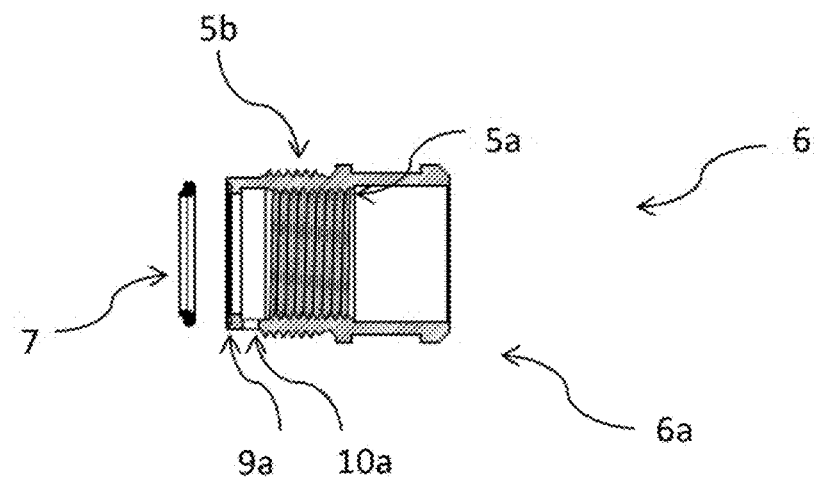
FIG. 2 shows an embodiment of the securement arrangement of the present disclosure.

FIG. 2 shows a possible embodiment of the securement arrangement in longitudinal section, comprising a connection adapter 6 and a sealing element 7. The connection adapter 6 includes a cylindrical basic body 6a, a first securement element 5a for securing the connection adapter 6 to the field instrument 1, as well as a second securement element 5b for securing the connection adapter 6 to a container adapter 8. The connection adapter 6 is securable to the field instrument 1 in such a manner that the connection adapter 6 surrounds the field instrument 1, at least partially, when the connection adapter 6 is secured to the field instrument 1. Additionally, the connection adapter 6 is securable to a container adapter 8 (not shown) by means of the second securement element 5b in such a manner that the container adapter 8 surrounds the connection adapter 6, at least partially, when the container adapter 8 is secured to the connection adapter 6. The first securement element 5a is shown in FIG. 2 embodied, for the sake of convenience, as an internal screw thread. The second securement element 5b is shown embodied, for the sake of convenience, as an external screw thread. Other options of securement are not excluded for the first and second securement elements. The connection adapter 6 includes, moreover, a first support 9a for accommodating the sealing element 7. The sealing element 7, which is an O-ring or a seal of some other shape, can, in such case, be accommodated on the support 9a of the connection adapter.

Figure 3:
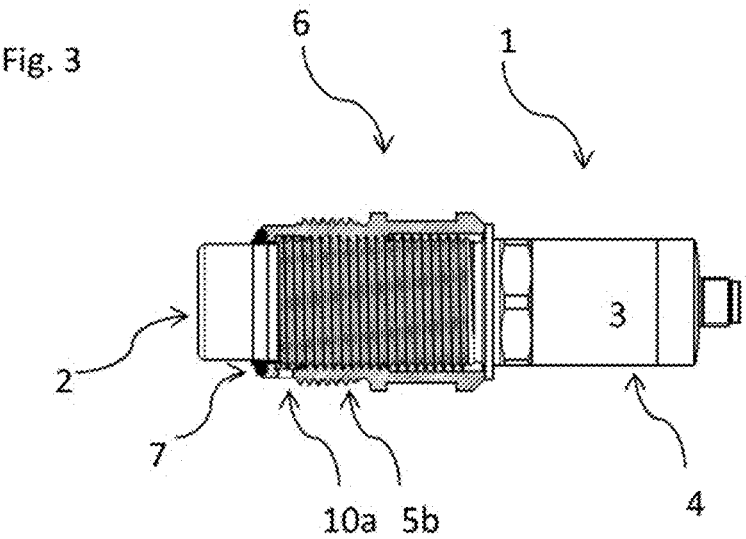
FIG. 3 shows an embodiment of the securement arrangement of the present disclosure connected with the field instrument.

FIG. 3 shows a possible embodiment of the securement arrangement of the invention secured to the field instrument 1. The connection adapter 6 is, firstly, secured to the field instrument 1 by means of the first and fifth screw threads 5a,e, which are mutually complementary. Then the sealing element 7 is pushed over the sensor 2 of the field instrument 1 and accommodated in the first support 9a of the connection adapter. Thus, the sealing element 7 can by means of the connection adapter 6 be mounted on the field instrument 1 and the target position of the sealing element 7 visually checked.

Figure 4:
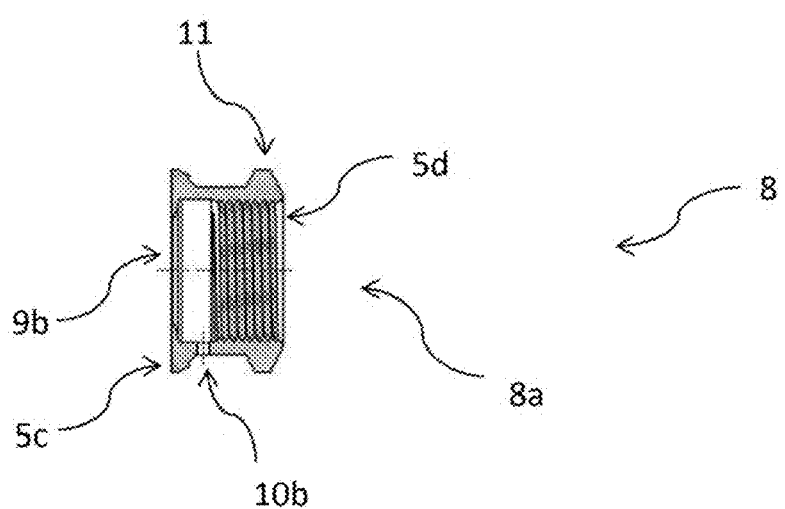
FIG. 4 shows an embodiment of the container adapter of the present disclosure.

A possible embodiment of the container adapter 8 is shown in FIG. 4. The cylindrical basic body 8a of the container adapter 8 includes a third securement element 5c for securing the container adapter 8 to the container (not shown), a fourth securement element 5d for securing the container adapter 8 to the connection adapter 6 by means of the second screw thread 5b and a second support 9b of the container adapter 8 for accommodating the sealing element 7. FIG. 4 shows the third securement element 5c embodied as a means for welding. Alternatively, also a means for clamping or screwing could be used. Additionally, the container adapter 8 has in a container far, end region a greater thickness 11 of the basic body compared with a middle region. This greater thickness 11, or reinforcement, of the material, or ridge, serves in such case as protection against deformation of the container adapter 8 in the case of welding into the container. The fourth securement element 5d comprises in FIG. 4 an internal screw thread; other options for securement are, however, also in this case, not excluded. Advantageously, the first and second supports 9a,b are embodied, in each case, as support surfaces, wherein other alternatives for embodiment of the supports, such as a change of the outer diameter of the connection adapter, likewise provide options. The embodiment of the mutually complementary supports is then shown in FIG. 5. In the region of the lateral surface of the container adapter 8, a hole 10b is arranged at a location along the longitudinal axis of the container adapter 8. In such case, the second support 9b is arranged between the hole 10b of the container adapter and a container near, end section of the container adapter 8. In the adapter arrangement, the connection adapter 6 likewise includes a hole 10a in a corresponding region. This will be explained in greater detail below based on the measuring arrangement shown in FIG. 5.

Figure 5:
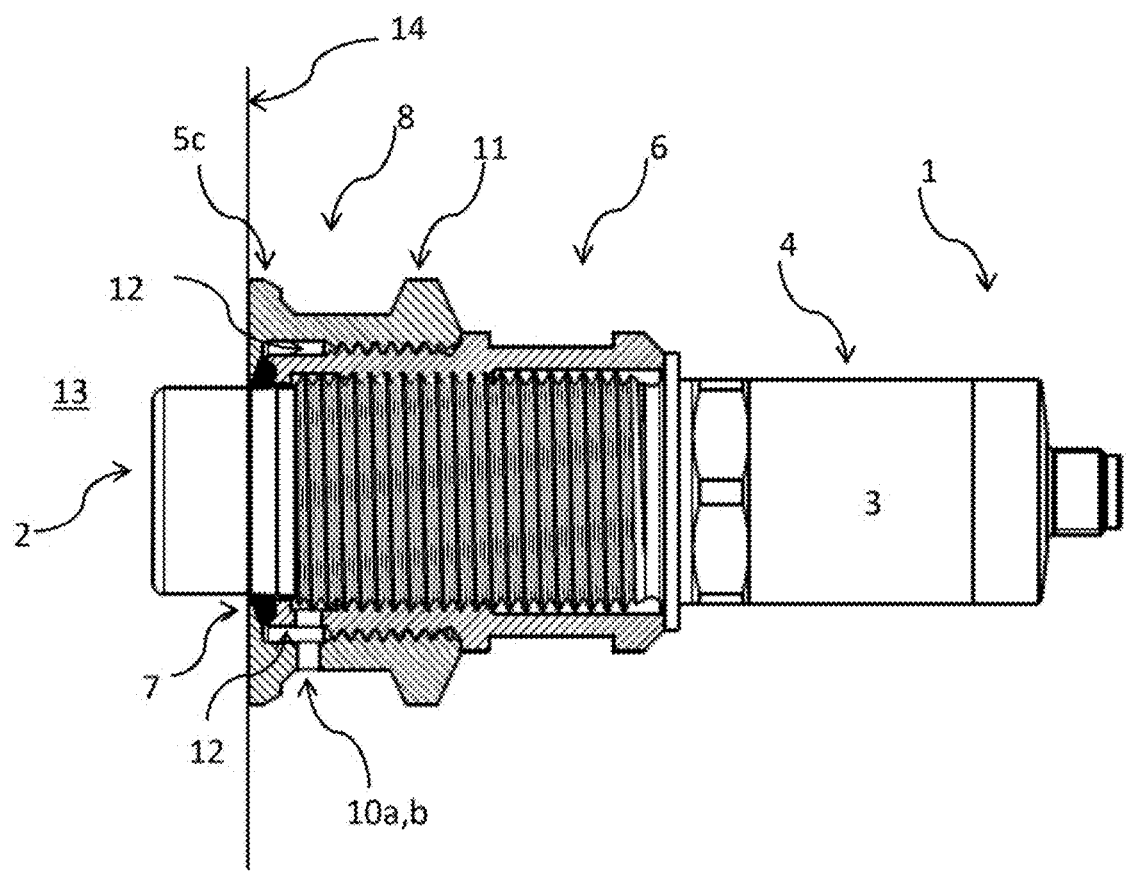
FIG. 5 shows an embodiment of the measuring arrangement of the present disclosure.

FIG. 5 shows an embodiment of the measuring arrangement including the field instrument 1, connection adapter 6, container adapter 8 sealing element 7, and the container wall 14, and shows the medium 13. In comparison with FIG. 3 in such case, supplementally, the container adapter 8 is secured to the connection adapter 6 by means of the mutually complementary second and fourth screw threads. The field instrument 1 has a constant outer diameter in the first region, which protrudes inwardly into the connection adapter 6, and in the second region, which protrudes inwardly into the container adapter 8, which lies against the container wall 14. The fifth screw thread 5e effects no change of the outer diameter of the field instrument 1. The first and second supports 9a,b are embodied to be mutually complementary, such that the sealing element 7 can be accommodated accurately fit between the two supports, when the connection adapter 6 is secured to the container adapter 8. The first and second supports 9a,b accommodate the sealing element 7 and exercise at the same time a force on the sealing element 7, whereby such is radially and/or axially deformed. The two holes 10a,b of the connection adapter and the container adapter are arranged in such a manner that they align with one another in the assembled measuring arrangement. Alternatively, the two holes 10a,b can also at least overlap. An intermediate space 12 connects the outer diameter of the sealing element 7 with the two holes 10a,b and is arranged radially between the lateral surface of the connection adapter and the inner wall of the container adapter. The intermediate space 12 is optional and combinable with other embodiments to the extent desired. The combination of the holes 10a,b and the intermediate space 12 enables an easy exit of the medium in the case of leakage.

The invention claimed is:

1. A securement arrangement for introducing a field instrument into a container, wherein the field instrument includes a housing and a sensor, wherein the sensor of the field instrument protrudes, at least partially, inwardly into the container, and wherein the field instrument serves for determining and/or monitoring a physical or chemical, process variable of a medium in the container, comprising
 a connection adapter including a cylindrical basic body, on which components are arranged as follows,
  a first securement element for securing the connection adapter to the field instrument, wherein the connection adapter is securable to the field instrument in such a manner that the connection adapter at least partially surrounds the field instrument, when it is secured to the field instrument,
  a second securement element for securing the connection adapter to a container adapter, wherein the connection adapter is securable to the container adapter in such a manner that the container adapter at least partially surrounds the connection adapter, when it is secured to the connection adapter, and
  a first support of the connection adapter for accommodating a sealing element in an end section of the basic body, and
 the sealing element, wherein the sealing element is so embodied that it can be accommodated on the support of the connection adapter and wherein the sealing element is arranged in contact with the medium when the field instrument is secured at the container.

2. The securement arrangement as claimed in claim 1, wherein the sealing element is an O-ring or a shaped seal.

3. An adapter arrangement for introducing a field instrument into a container, comprising
 a securement arrangement including:
  a connection adapter including a cylindrical basic body, on which components are arranged as follows,
   a first securement element for securing the connection adapter to the field instrument, wherein the connection adapter is securable to the field instrument in such a manner that the connection adapter at least partially surrounds the field instrument, when it is secured to the field instrument,
   a second securement element for securing the connection adapter to a container adapter, wherein the connection adapter is securable to the container adapter in such a manner that the container adapter at least partially surrounds the connection adapter, when it is secured to the connection adapter, and
   a first support of the connection adapter for accommodating a sealing element, in an end section of the basic body, and
  the sealing element, wherein the sealing element is so embodied that it can be accommodated on the support of the connection adapter, and wherein the sealing element is arranged in contact with the medium when the field instrument is secured at the container; and
 a container adapter for securing the field instrument to the container, and including a cylindrical basic body, on which components are arranged as follows,
  a third securement element for securing the container adapter to the container,
  a fourth securement element for securing the container adapter to the connection adapter by means of the second securement element, and
  a second support of the container adapter for accommodating the sealing element.

4. The adapter arrangement as claimed in claim 3, wherein the first and/or the second support is/are embodied in the form of a change in outer diameter of the connection adapter and a change in outer diameter of the container adapter in the form of a step, or a support surface.

5. The adapter arrangement as claimed in claim 4, wherein the first and second supports are embodied to be mutually complementary and interact in such a manner that the sealing element can be accommodated between the two supports, when the connection adapter is secured to the container adapter.

6. The adapter arrangement as claimed in claim 5, wherein the first and second supports exert a force on the sealing element, when the connection adapter is secured to the container adapter, wherein the sealing element is radially and/or axially deformable as a result of the force exerted by the supports.

7. The adapter arrangement as claimed in claim 6, wherein at least one hole is arranged, in each case, in the region of a lateral surface of the basic body of the connection adapter and the basic body of the container adapter, wherein the holes of the connection adapter and of the container adapter are arranged, in each case, along a longitudinal axis of the basic body of the connection adapter and the basic body of the container adapter in such a manner that the first, or second support is/are arranged between the hole of the connection adapter, or the hole of the container adapter, and an end section of the connection adapter, or of the container adapter, facing the container.

8. The adapter arrangement as claimed in claim 7, wherein the holes of the connection adapter and the container adapter are so arranged that the hole of the connection adapter and the hole of the container adapter, at least partially, overlap, when the connection adapter is secured to the container adapter.

9. The adapter arrangement as claimed in claim 8, wherein the third securement element includes component for using welding, screwing or clamping.

10. The adapter arrangement as claimed in claim 9, wherein, when the third securement element of the container adapter comprises the component for using welding, the container adapter has in an end region of the container adapter away from the container a greater thickness than the basic body of the container adapter in a middle region.

11. A measuring arrangement for introducing a field instrument into a container, comprising
 a securement arrangement including:
  a connection adapter including a cylindrical basic body, on which components are arranged as follows,
   a first securement element for securing the connection adapter to the field instrument, wherein the connection adapter is securable to the field instrument in such a manner that the connection adapter at least partially surrounds the field instrument, when it is secured to the field instrument, a second securement element for securing the connection adapter to a container adapter, wherein the connection adapter is securable to the container adapter in such a manner that the container adapter at least partially surrounds the connection adapter, when it is secured to the connection adapter, and a first support of the connection adapter for accommodating a sealing element, in an end section of the basic body, and the sealing element, wherein the sealing element is so embodied that it can be accommodated on the support of the connection adapter, and wherein the sealing element is arranged in contact with the medium when the field instrument is secured at the container; and a container adapter for securing the field instrument to the container, and including a cylindrical basic body, on which components are arranged as follows, a third securement element for securing the container adapter to the container, a fourth securement element for securing the container adapter to the connection adapter by means of the second securement element, and a second support of the container adapter for accommodating the sealing element, and a field instrument including an electronics and a sensor, wherein the sensor and the electronics of the field instrument are surrounded, at least partially, by at least one housing, and wherein the housing of the field instrument includes a fifth securement element for securing the field instrument to the connection adapter using the first securement element.

12. The measuring arrangement as claimed in claim 11, wherein at least a first region of the field instrument, which protrudes, at least partially, inwardly into the connection adapter, when the field instrument is secured to the connection adapter, and at least a second region of the field instrument, which protrudes, at least partially, inwardly into the container adapter and into the container, when the field instrument is secured to the container adapter using the connection adapter, have the same outer diameter, wherein the fifth securement element, when it is arranged in the first or second region of the field instrument, effects no change of the outer diameter of the first and second regions of the field instrument.

13. The measuring arrangement as claimed in claim 12, wherein at least one of the securement elements comprises a screw thread.

14. The measuring arrangement as claimed in claim 13, wherein the first and fifth, and the second and fourth screw threads are embodied to complement one another, especially wherein, in each case, an internal screw thread engages with a complementary external screw thread.

15. The measuring arrangement as claimed in claim 13, wherein the field instrument is a field instrument working according to the capacitive and/or conductive measuring principle, wherein a process variable is fill level, conductivity or dielectric constant.

* * * * *